United States Patent [19]

Burkman et al.

[11] Patent Number: 5,717,857
[45] Date of Patent: Feb. 10, 1998

[54] SYSTEM FOR SWITCHING DATA CONNECTION TO USE FIRST CHANNEL AND SECOND CHANNEL WITHOUT SUBSTANTIAL INTERRUPTION OF TRANSFER OF AUDIO SIGNALS AND IMAGE DATA BETWEEN COMPUTERS

[75] Inventors: Allen P. Burkman, Sugar Grove; Allison A. Carleton, Chicago; Theresa M. Pommier, Westmont; Paul A. Peterson, Oak Park; Shiv M. Seth, Naperville, all of Ill.

[73] Assignee: NCR Corporation, Dayton, Ohio

[21] Appl. No.: 789,858

[22] Filed: Jan. 28, 1997

Related U.S. Application Data

[63] Continuation of Ser. No. 442,207, May 16, 1995, abandoned, which is a continuation-in-part of Ser. No. 35,092, Mar. 19, 1993.

[51] Int. Cl.⁶ ........................................ G06F 13/00
[52] U.S. Cl. .................. 395/200.04; 395/330; 395/331; 370/260; 379/202
[58] Field of Search .............. 395/200.04, 200.01, 395/200.02, 200.03, 200.08, 200.1, 200.11, 330, 331, 806; 370/260, 261–267, 271, 468, 487; 348/12–15; 379/202–205

[56] References Cited

U.S. PATENT DOCUMENTS

| | | | |
|---|---|---|---|
| 4,757,495 | 7/1988 | Decker et al. | 370/477 |
| 5,164,982 | 11/1992 | Davis | 379/96 |
| 5,187,707 | 2/1993 | Chu et al. | 370/236 |
| 5,313,467 | 5/1994 | Varghese et al. | 370/468 |
| 5,343,240 | 8/1994 | Yu | 348/14 |
| 5,351,076 | 9/1994 | Hata et al. | 348/14 |
| 5,365,576 | 11/1994 | Tsumura | 379/93 |
| 5,365,577 | 11/1994 | Davis et al. | 379/96 |
| 5,371,534 | 12/1994 | Dagdeviren et al. | 348/14 |
| 5,375,068 | 12/1994 | Palmer et al. | 370/260 |
| 5,381,412 | 1/1995 | Otani | 370/391 |
| 5,392,223 | 2/1995 | Caci | 364/144 |
| 5,463,629 | 10/1995 | Ko | 370/463 |
| 5,475,421 | 12/1995 | Palmer et al. | 348/15 |
| 5,490,208 | 2/1996 | Remillard | 379/96 |

FOREIGN PATENT DOCUMENTS 535890 4/1993 European Pat. Off. .

OTHER PUBLICATIONS

"A Tale of Two Modems", by Derfler, F.J. Jr., PC Magazine, v3, n16, pp.237–238, Aug. 21, 1984.
"ISDN's PC Cards", TeleConnect, v7, n7, p. 35(3), Jul., 1989.
IEEE Communications Magazine, vol. 30, No. 5, 1 May 1992, New York, NY, US, pp. 38–43, XP000321469.
Ahuja S R et al: "Coordination and Control of Multimedia Conferencing" * p. 39, right–hand column, line 46—p. 41.

*Primary Examiner*—Moustafa M. Meky
*Attorney, Agent, or Firm*—Gregory A. Welte; George H. Gates

[57] ABSTRACT

The invention concerns placing an exploratory telephone call to a party, using a first telephone channel, in order to inquire whether the party wishes to hold a video conference. If the party does, the caller then actuates the invention, which establishes an initial video conference on a second data channel, without disrupting the existing telephone call. Then, after the video conference has been established, the exploratory telephone call is terminated, and the first channel is used to carry the video conference data, along with the second channel.

15 Claims, 10 Drawing Sheets

Microfiche Appendix Included
(4 Microfiche, 351 Pages)

DESIGNER          MAX

SYSTEM FOR SWITCHING DATA CONNECTION TO USE FIRST CHANNEL AND SECOND CHANNEL WITHOUT SUBSTANTIAL INTERRUPTION OF TRANSFER OF AUDIO SIGNALS AND IMAGE DATA BETWEEN COMPUTERS

This is a Continuation of application Ser. No. 08/442,207, filed May 16, 1995, now abandoned, which is a continuation-in-part of application Ser. No. 08/035,092, filed Mar. 19, 1993, still pending.

A microfiche appendix containing 4 fiche and 351 frames total is filed herewith.

The invention concerns video conferencing systems, wherein a user can initiate a video conference by first making an ordinary telephone call, to inquire whether a video conference is desired. Then, if so, the user switches over from the ordinary call to a video conference, without the steps of (1) terminating the ordinary call, (2) re-dialing, and (3) waiting for the video conference to be established.

The switchover can also be done during an audio call, when the parties wish to transmit visual images, such as an image of a document.

BACKGROUND OF THE INVENTION

Video conferencing systems exist today, and their use will become more widespread as time progresses. In a typical video conferencing system, all participants in the conference, who are present at different locations, are equipped with video cameras, video displays, audio microphones and audio speakers. This equipment allows the users to see and speak with each other, as though present at a single conference table, in a single room.

In addition, the video cameras and displays allow a participant to present materials of interest to the other participants, such as documents or physical objects, as though making a live, personal presentation.

In general, setting up a video conference requires some delays, for several reasons. One is that computers are involved in handling the audio and video signals used in the conference. These computers must, of course, be operative, which requires that they be switched on. Switching-on requires that they run through their initialization routines, which takes time.

Even if the computers are up-and-running, and require no switching, nevertheless, in establishing the video conference, the computer at each participant's location must do things such as (1) agree on modes of data transfer with another computer and (2) run preliminary tests of data transfer, and of certain equipment. Thus, establishing a video conference can require a delay of a few seconds, if the computers are up-and-running, or a minute or more, if the computers must be initialized.

Further, the delay is in addition to the inherent small delay in placing a telephone call. The computers must dial telephone numbers, and wait for other computers to answer the calls.

Therefore, because of the delays inherent in establishing a video conference, it is expected that people will first make an exploratory telephone call, in order to inquire whether a video conference is possible.

It is expected that people will not, in general, attempt an un-announced video conference, because of the time required in setting up the conference. This set-up time will be wasted if the conference fails to be held.

Restated, until technology advances to the point where the time required for initializing video conferences becomes minimal, people will avoid making "cold" video conference calls, and will instead make exploratory audio calls first.

Two additional factors also suggest that exploratory calls will be made prior to video calls. (1) Establishing a video call is somewhat intrusive, in the sense that a video image of the called person becomes immediately available to the caller. Thus, it is possible that, in practice, people will suspend the video transmission abilities of their conference systems, most of the time.

With this suspension, time would be wasted by a caller in attempting to establish a video call: the call will not succeed. Consequently, a caller is expected to make an exploratory audio call first, to ascertain whether video transmission has been suspended and, if so, to request that it be re-enabled.

(2) At present, the cost of making a video call is greater than the cost of making an audio call, because data transmission is more expensive than voice transmission.

Independent of the preceding reasons for making exploratory audio calls, it is expected that parties to ordinary telephone calls would like the ability to transmit visual images, of articles such as documents and physical objects. In general, switchover to a video call is required to accomplish this transmission, unless a video call was made initially.

OBJECTS OF THE INVENTION

An object of the invention is to provide a system wherein an audio telephone call can be converted to a video conference.

Another object of the invention is to provide a system wherein an audio telephone call can be converted to a video conference, without terminating the audio call and re-dialing.

SUMMARY OF THE INVENTION

In one form of the invention, a caller places an ordinary telephone call to a called person. If the called person indicates that a video conference would be desirable, then the caller actuates the invention, which establishes the video conference, yet without terminating the audio connection. The parties can still talk while the video conference is being established.

DETAILED DESCRIPTION OF THE INVENTION

Figure 1:
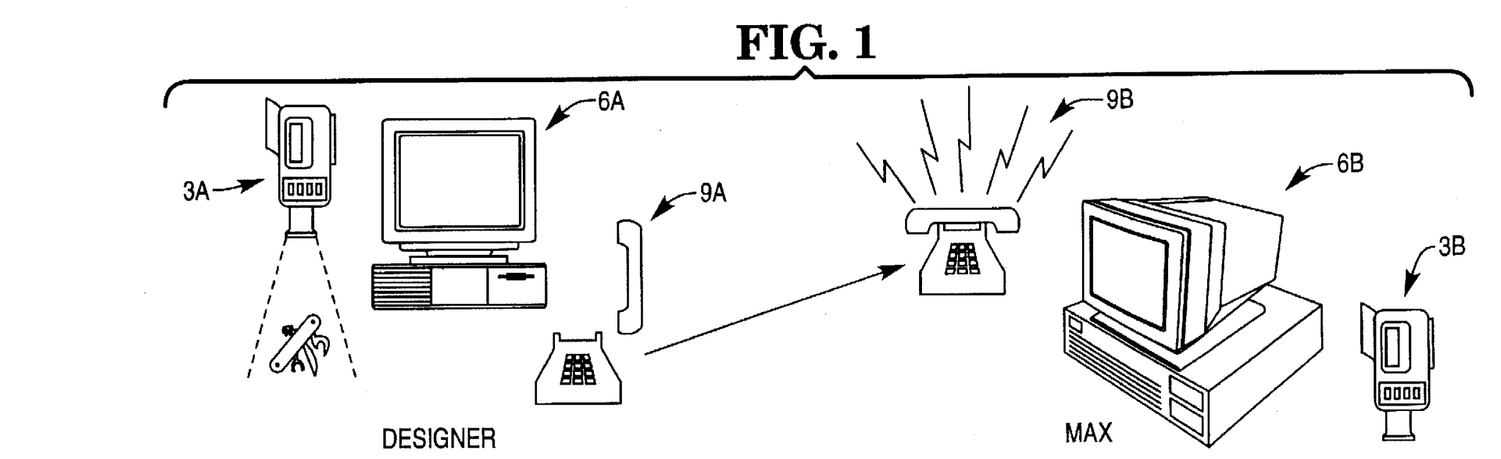
FIGS. 1–4 illustrate a sequence of events which will occur during use of the invention.

FIG. 1 illustrates some of the video conferencing equipment used by two conference participants. Each participant has a video camera 3, a micro computer 6, and a telephone 9. Audio microphones and speakers are also used, but not shown.

Assume that the two participants are located in different cities, but are working on a common project, such as development of a new pocket knife. One example of their use of the invention would be the following.

The knife designer would pick up telephone 9A, as indicated by the off-hook receiver, and call Max, the advertising manager. It is preferred that, at this time, the designer's computer is running, because the designer's computer will be called upon to dial a second telephone number, as will be explained shortly.

Figure 2:
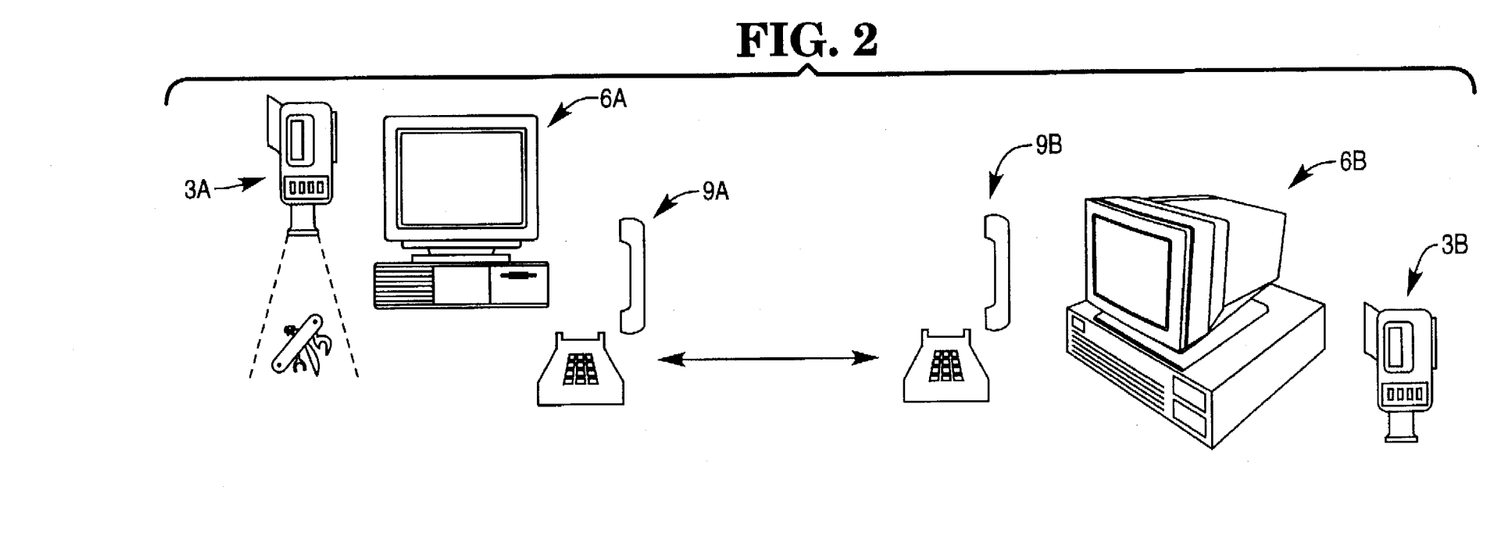

Max's telephone 9B rings, as indicated. When Max answers the audio call, telephone 9B goes off-hook, as indicated in FIG. 2.

Figure 3:
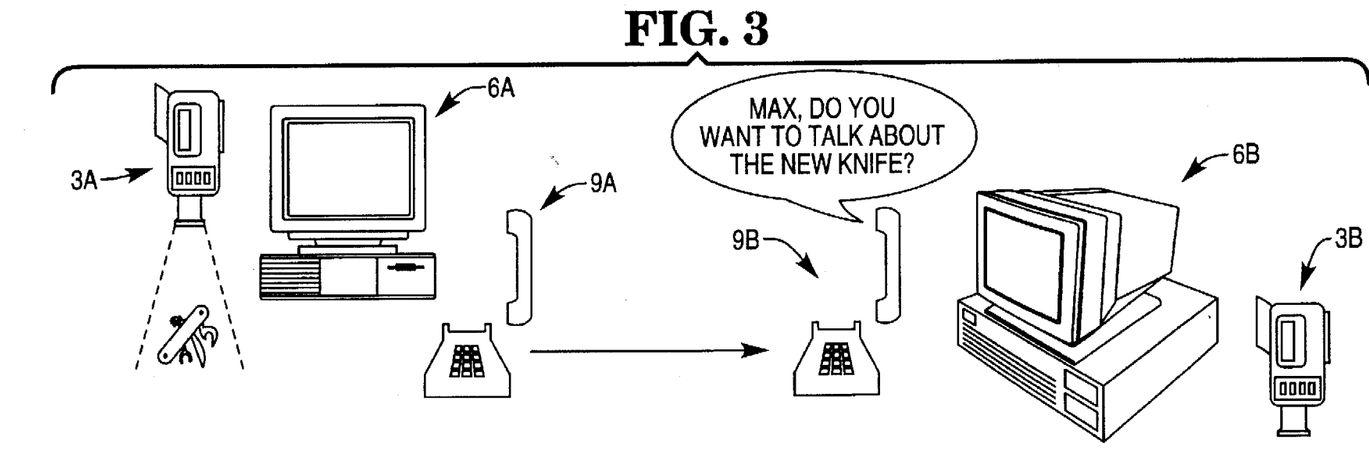

The knife designer now asks whether Max would like to see the new knife, as indicated in FIG. 3. If Max says "Yes," then the knife designer actuates the invention, which establishes a video conference, and the knife appears on Max's display 12.

Figure 4:
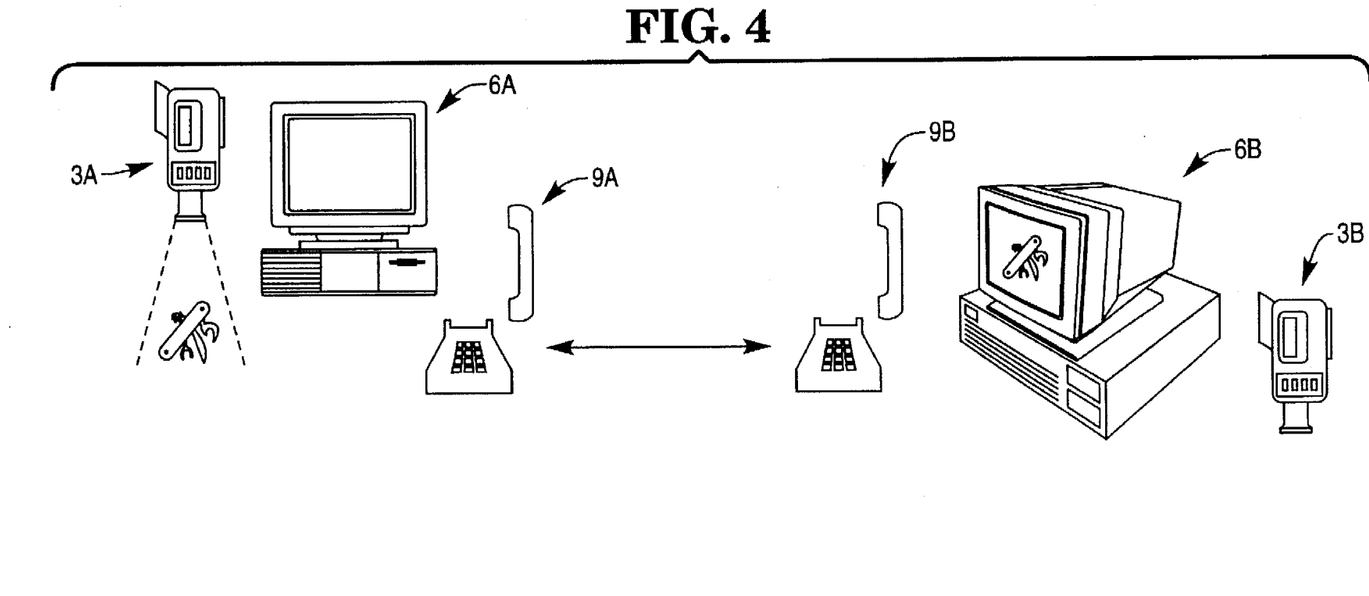
Figure 5:
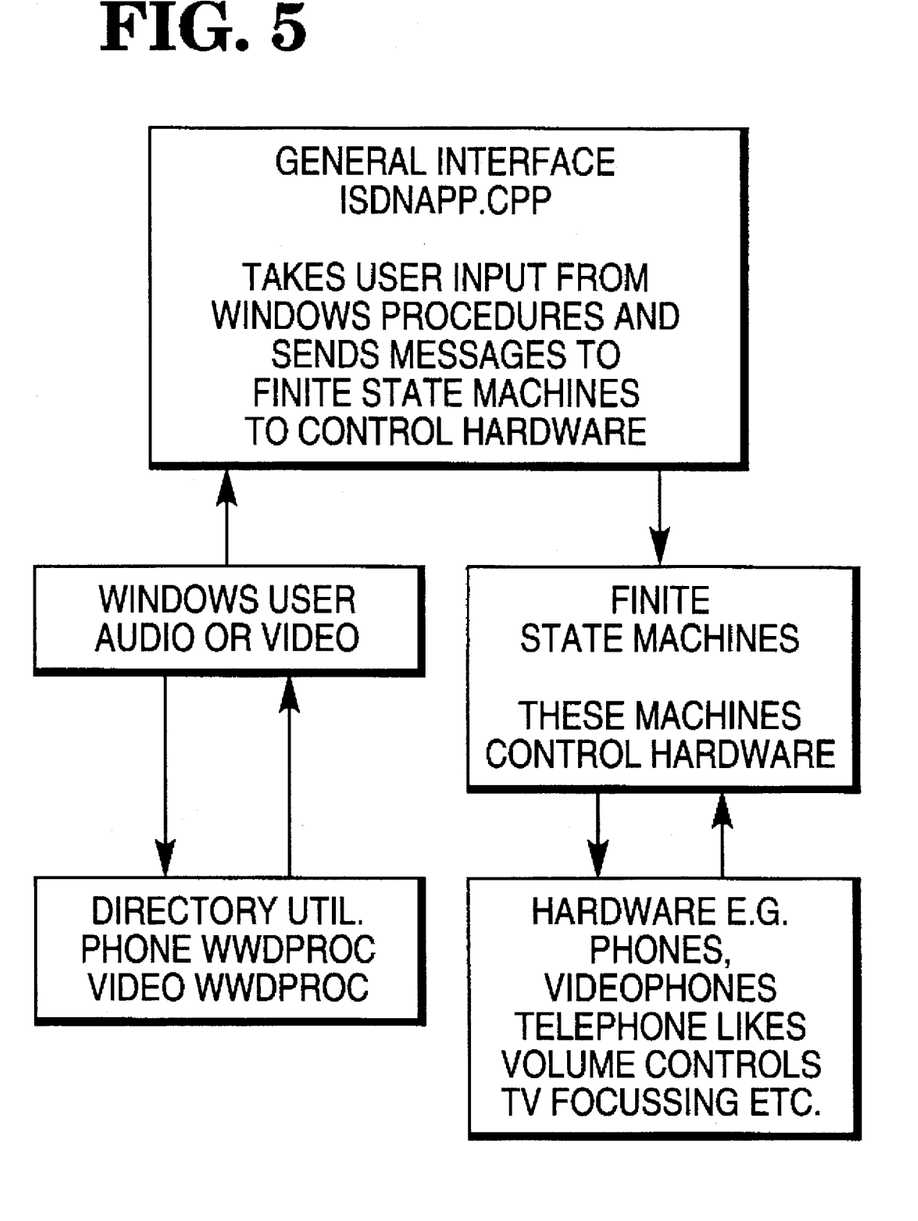
FIGS. 5, 6A, 6B, 7–11 contain a flow chart explaining events which occur during operation of the invention.
Figure 6A:
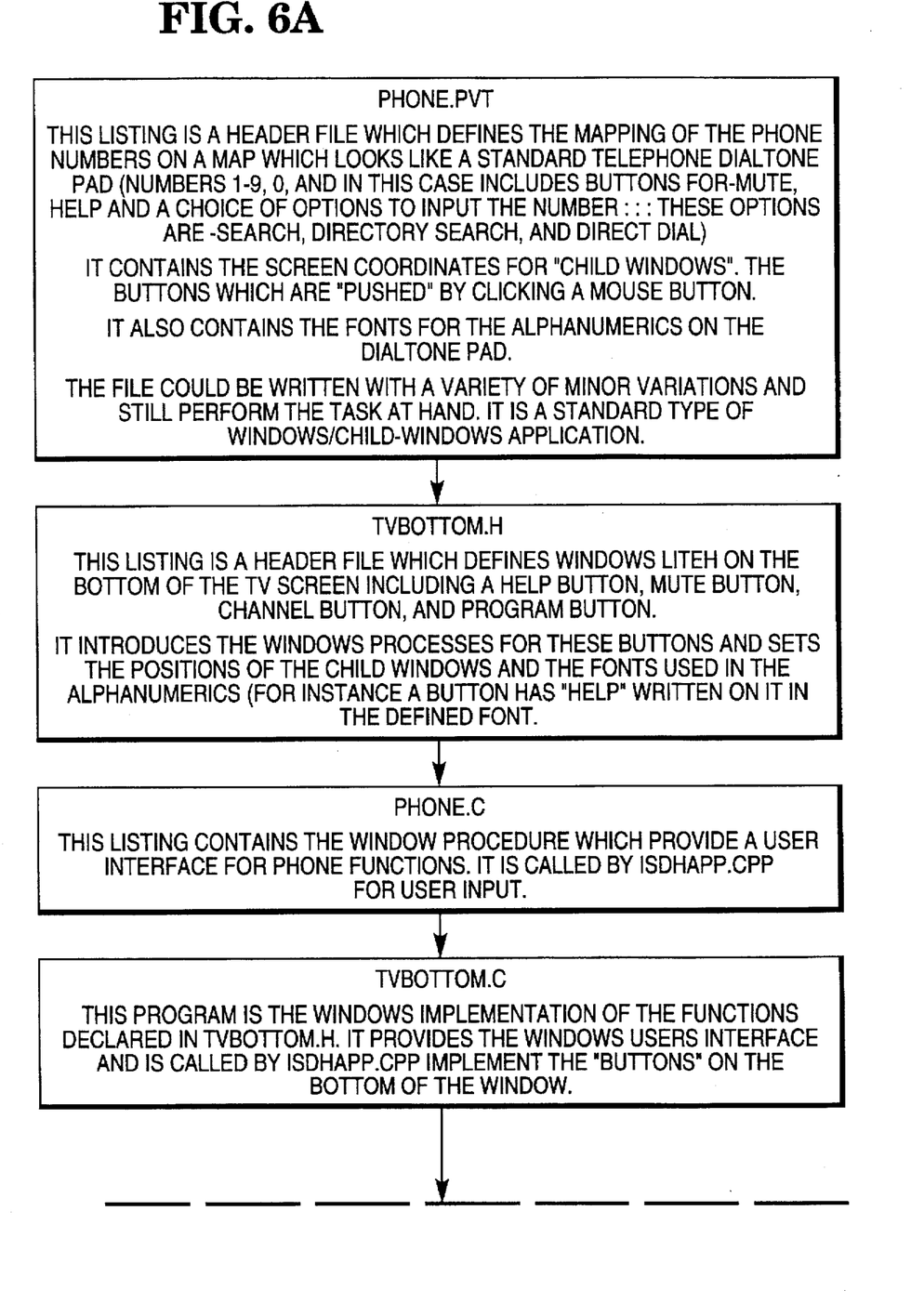
Figure 6B:
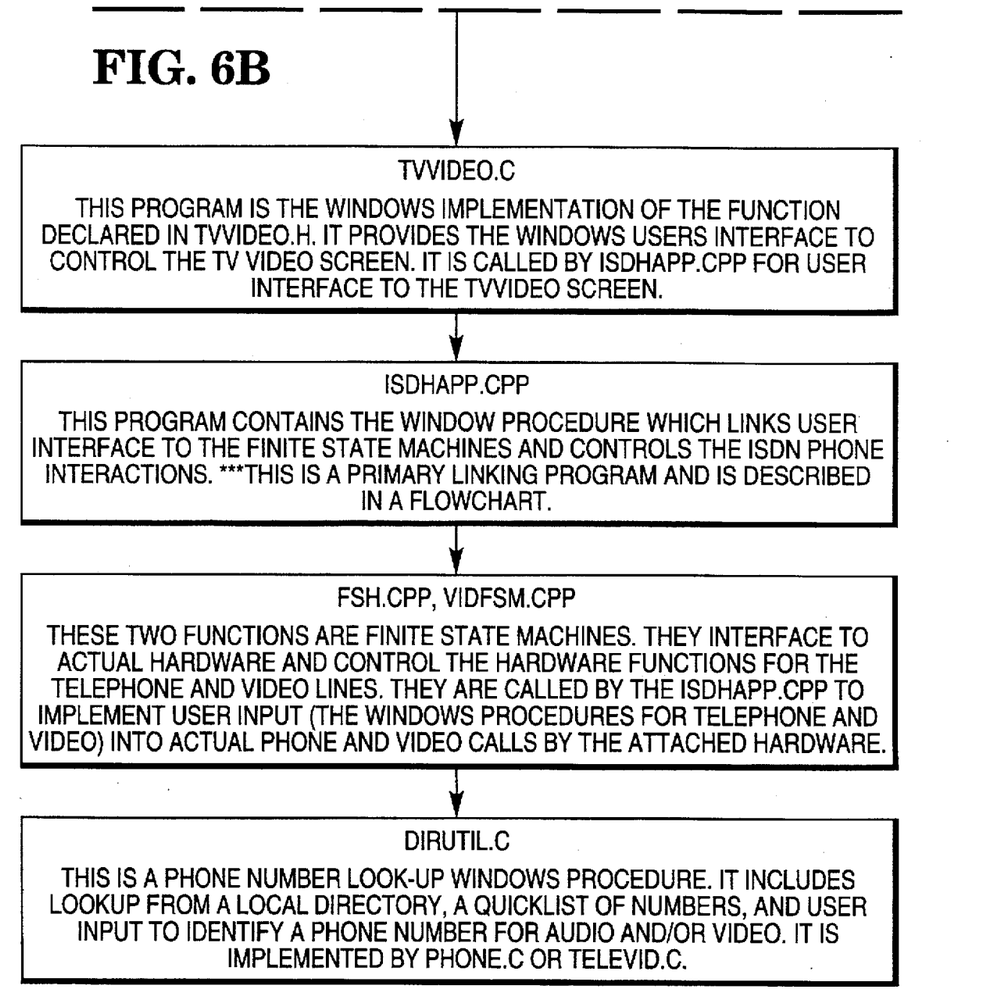
Figure 7:
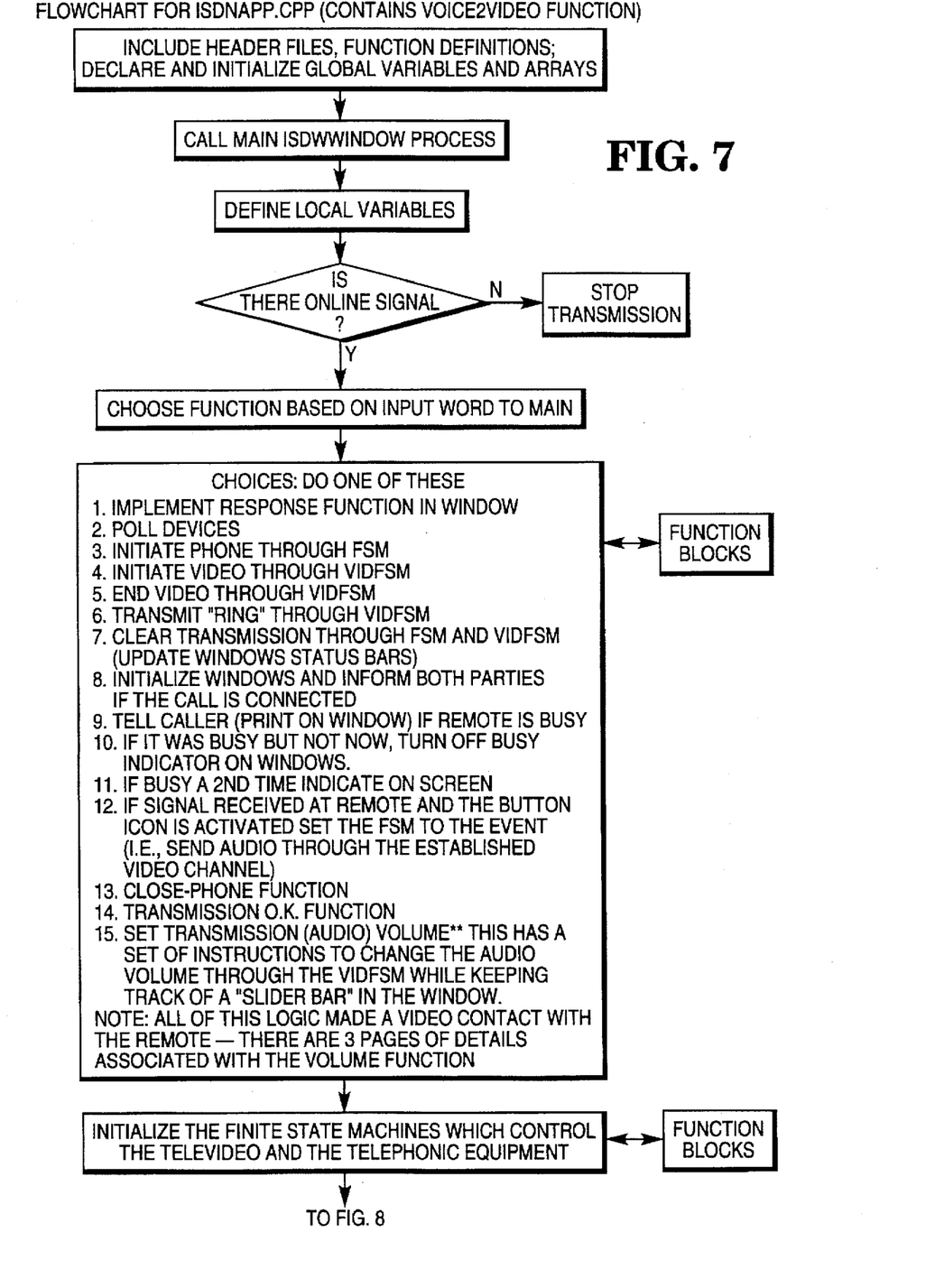
Figure 8:
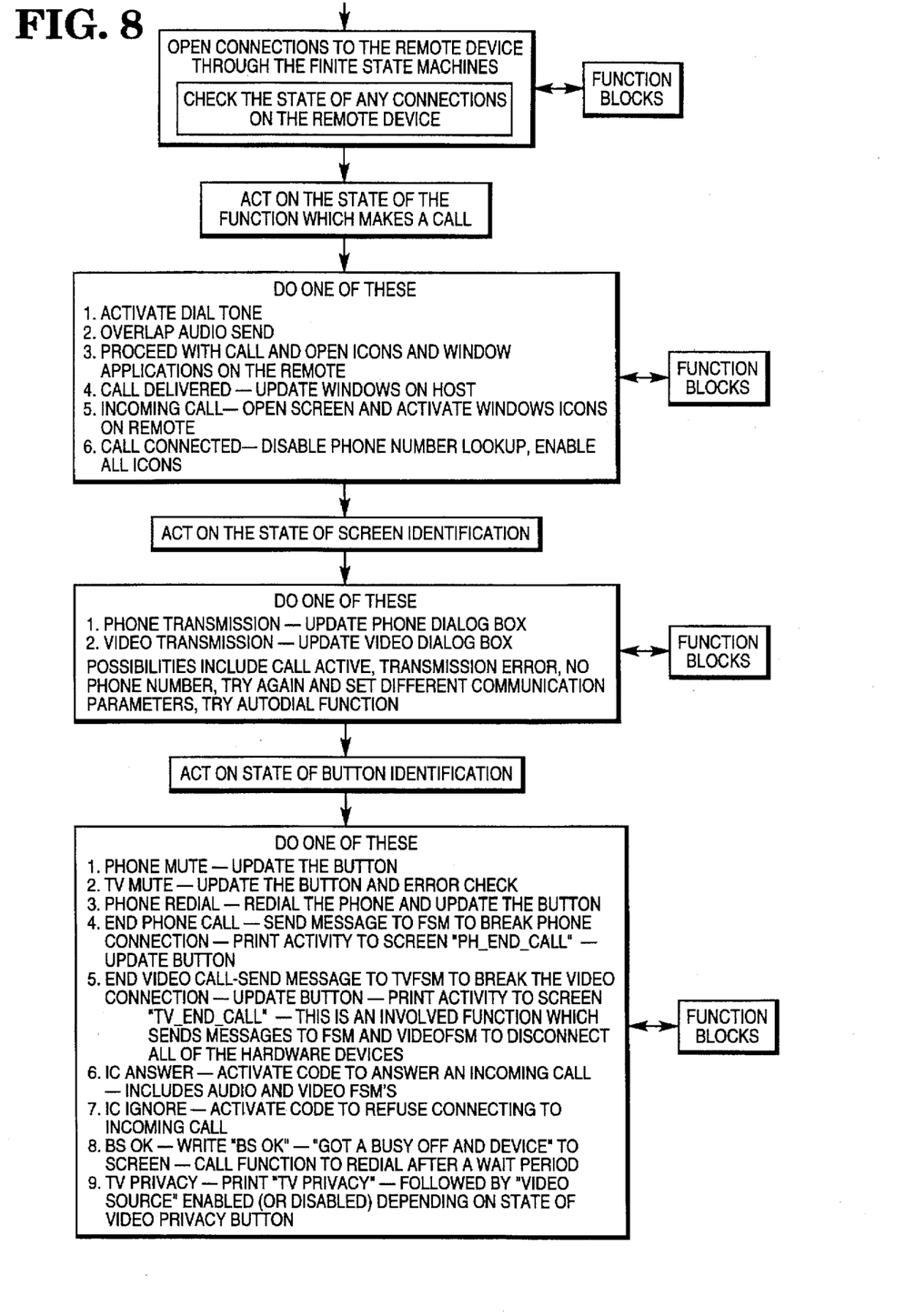
Figure 9:
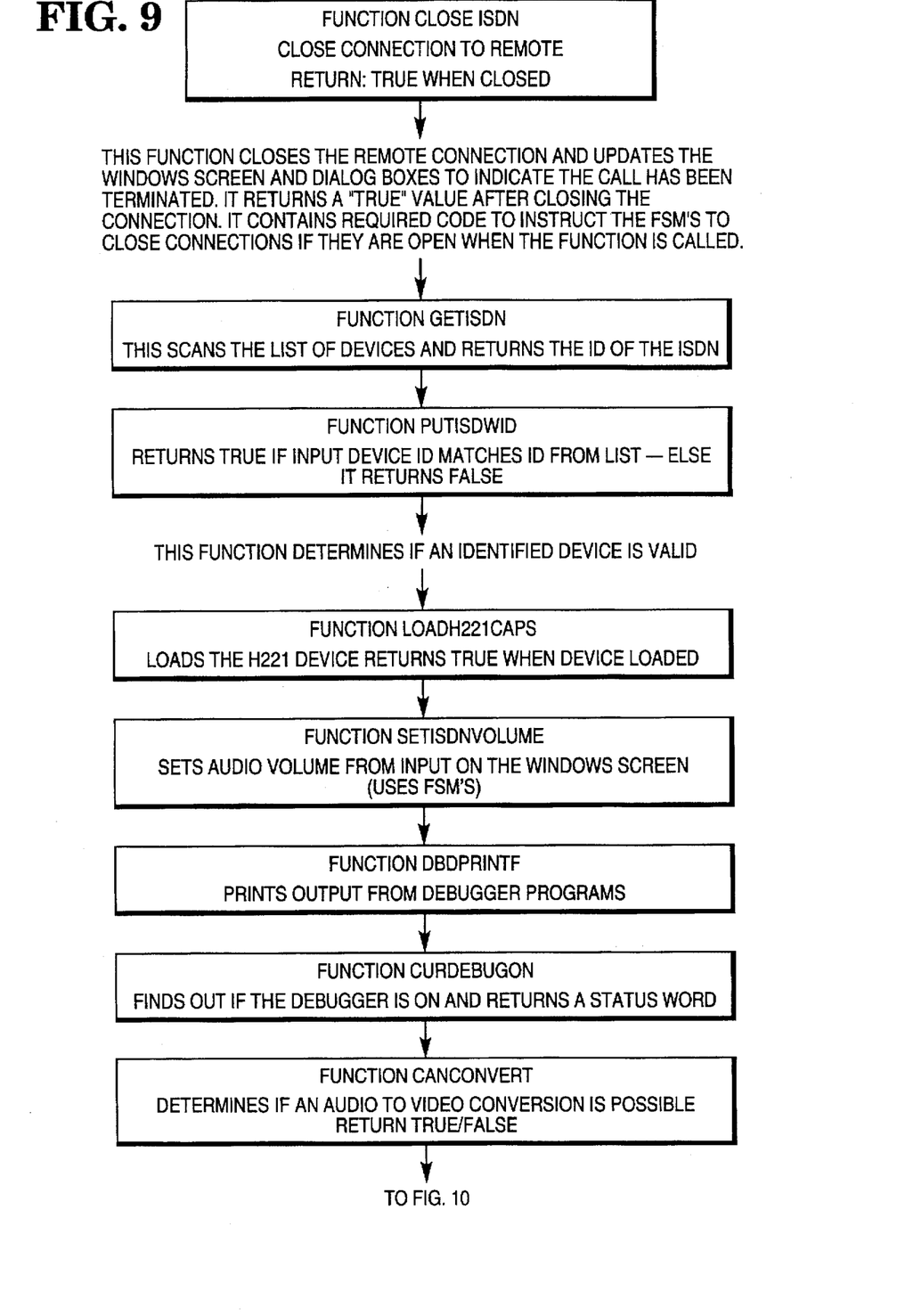
Figure 10:
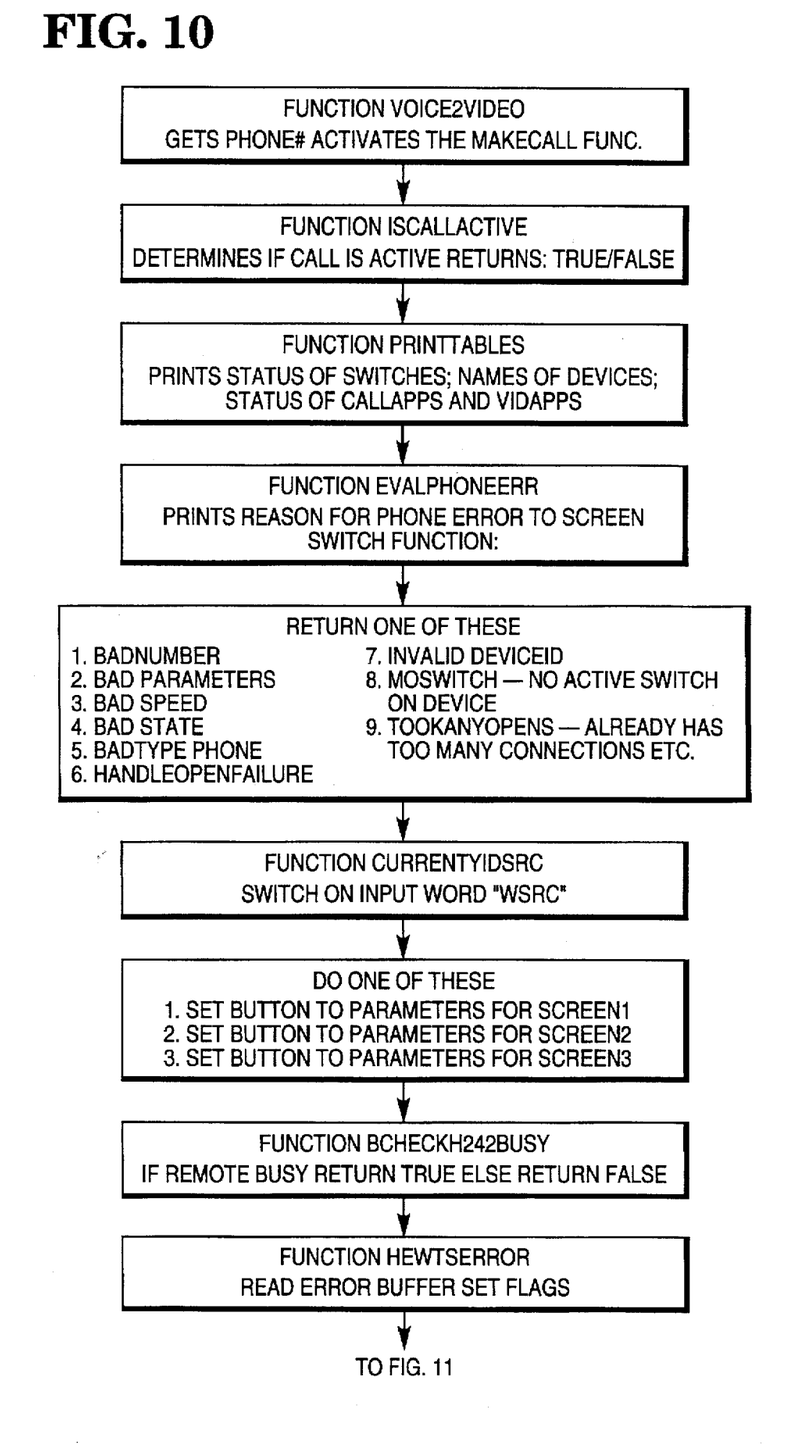
Figure 11:
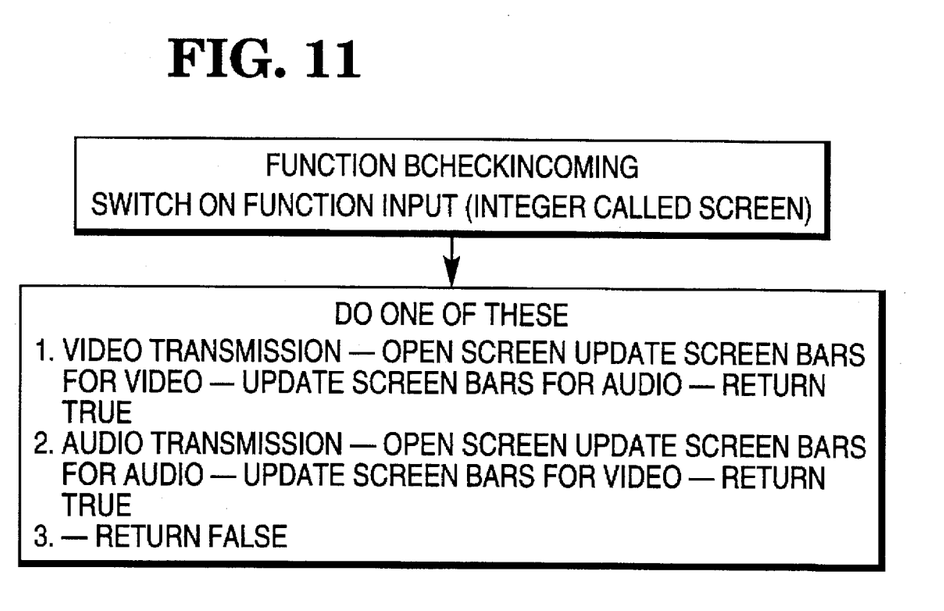

Significantly, during the initialization procedure for the video conference, the original telephone conference was not disrupted in any significant way. The parties can maintain conversation while the video conference was being set up, and can discuss the progress of the set-up which they observe.

FIGS. 5-11 provide a flow chart which explains the logic followed by the invention, and are considered self-explanatory. Computer code which implements the invention is contained in the microfiche appendix. This code can be added to that contained in the microfiche appendices of the parent applications. (Some of the applications incorporated by reference contain substantially similar code to that of the microfiche appendix of the instant Specification.) Alternately, a user can write original code, based on the flow chart of FIGS. 5-11.

ADDITIONAL CONSIDERATIONS

1. The invention can be used with the commercially available video conferencing system known as the TeleMedia Connection, available from AT & T Corporation, Naperville, Ill. Parts of this system are described in the following U.S. Patent Applications, which are hereby incorporated by reference:

A. Ser. No. 08/035,092, entitled "Remote Collaboration System," by Carleton, et al., filed on Mar. 19, 1993, still pending, and assigned to NCR Corporation.

B. Ser. No. 08/035,091, entitled "Remote Collaboration System," by Fitzpatrick, et al., filed on Mar. 19, 1993, still pending, and assigned to NCR Corporation.

C. Ser. No. 08/033,602, entitled "Remote Collaboration System," by Pommier, et al., filed on Mar. 19, 1993, still pending, and assigned to NCR Corporation.

D. Ser. No. 08/034,313, entitled "Remote Collaboration System," by Schwartz, et al. filed on Mar. 19, 1993, now U.S. Pat. No. 5,608,872, and assigned to NCR Corporation.

E. Ser. No. 08/128,013, entitled "Annotation of Computer Video Displays," by Carleton, et al., filed on Mar. 24, 1994, still pending, and assigned to NCR Corporation.

F. Ser. No. 08/128,018, entitled "Direct Capture of Video Conferencing Data," by Alonso-Cedó, et al., filed on Mar. 24, 1994, now abandoned, and assigned to NCR Corporation.

G. Ser. No. 08/128,017, entitled "Method and Apparatus for Display of Video Images in a Video Conferencing System," by Carleton, et al., filed on Mar. 24, 1994, now abandoned, and assigned to NCR Corporation.

H. Ser. No. 08/128,014, entitled "Palette Management for Application Sharing in Collaborative Systems," by Hester, filed on Mar. 24, 1994, now U.S. Pat. No. 5,608,426, and assigned to NCR Corporation.

I. Ser. No. 08/128,016, entitled "Collaborative Video Conferencing System," by Schwartz, et al., filed on Mar. 24, 1994, still pending, and assigned to NCR Corporation.

2. The conferencing system described in the preceding paragraph utilizes commercially available ISDN telephone service. This service provides three channels, or "lines," to the user. The invention uses one of the lines in making the initial audio call.

When the called party answers the call, and indicates that a video conference should be undertaken, the caller actuates the invention, preferably by making a selection on a pull-down menu on a computer. The invention then calls the called party's computer, or video conferencing system, using another ISDN channel, and establishes the video conference. During this establishment, the initial audio call, on a first ISDN channel, is undisturbed.

The ISDN channels impose limited bandwidth. The two main channels allow approximately 64 kilobits/second. A third channel is available, which carries certain control signals, and has a significantly reduced data capacity.

Because one 64K channel is used for the initial audio call, the bandwidth available for another call, such as the video conference, is restricted to that in the other channel, namely, 64K. Consequently, when the video conference is first established, using this single 64K channel, the video images will be somewhat jerky, and otherwise deficient, compared to the video which can be transmitted using two 64K channels.

To remedy this situation, after the video conference has been established, the bandwidth of the first channel is then devoted to the video conference. That is, the following events take place:

a) The invention terminates the initial audio call, just as though one of the parties placed a telephone on-hook. At the same time, the invention multiplexes the audio call into the video conference signals. The parties will hear a small click, or glitch, at this switchover, but their conversation will not be otherwise interrupted.

B) Now the audio channel, used by the initial call, is free. This channel is now used to carry the overall conference signals. The invention now distributes the conference signals (video plus audio) over the available channels, namely, over two 64K channels. Now, optimal bandwidth is available for the video signal, and the jerkiness, and other deficiencies, disappear.

It may seem peculiar that the initial audio call is actually terminated, or "hung up," and then re-established, in order to devote the first channel to carrying conference information. It may be thought that the connection could be maintained, while the invention simply displaced the audio signal by the conferencing signals.

However, this approach is not feasible at this time. The reason is that the ISDN system requires that the user initially specify the type of information which is being sent (voice or data), at the beginning of a call. It is, in general, not feasible to switch from one type to the other during a call.

(Of course, schemes can be imagined wherein a voice call is initiated, and then data is encoded in a manner that exhibits voice-like qualities, to thereby convert from voice to data during a single call. However, such an approach is not considered feasible, and is not used by the invention.)

3. Because of the termination and re-dialing of the audio call, the user's computer contains the required telephone numbers to automatically dial the called party, via the several ISDN channels.

4. The video data is preferably transferred using IEEE (Institute of Electrical and Electronic Engineers) standard H221.

5. Both the audio telephone call and the video conference call can be viewed as essentially involving the transfer of information.

a) Placing the initial, exploratory audio call, using an ISDN channel in voice-transmission mode (or audio mode), involves transfer of audio information.

b) Establishing the initial video conference, using an ISDN channel in data-transfer mode, involves transfer of video information.

c) Establishing the final video conference, using multiple ISDN channels in data-transfer mode, involves transfer of both audio and video information. The audio information becomes merged, or multiplexed, with the video information.

Viewed another way, the communication, either audio or video, is made possible by transfer of information. The information transfer supports the audio and video communication.

6. One aspect of the invention involves dynamic bandwidth allocation. For example, the exploratory audio call, on a first channel, consumes some of the ISDN's total bandwidth capacity. Establishing the initial video conference, on a second channel, consumes additional capacity. Terminating the audio call frees the bandwidth of the first channel, which, together with the second channel, is used to carry the final video conference.

7. During the initial, exploratory, audio call, far less information is carried by the first channel than is possible. As stated above, the first channel has a capacity of 64,000 bits/second. An ordinary telephone channel, which is capable of carrying this exploratory call, has a bandwidth of about 3,000 Hz.

Thus, during the exploratory call, a channel having a 64,000 bits/second capacity is used to transmit a message which ordinarily can occupy a 3,000 Hz bandwidth. This inefficiency is tolerated, in order to reduce the risk of spending the time to establish a video conference, and finding that other participants cannot attend.

8. As FIG. 8 indicates, near the bottom, a situation called "TV Privacy" may arise. This refers to the fact that the called party's video camera may have been de-activated. If so, the invention takes the actions indicated. In practice, the calling party will probably notify the called party of this de-activation, during the exploratory audio call.

9. A video conference can be termed a "video call," and an ordinary telephone call can be termed and "audio call."

10. The preceding discussion has been framed in terms of a single caller holding a video conference with a single other party. The extension to multi-party conferences is straightforward.

In particular, it is expected that one person will initiate a video conference, by making exploratory audio calls to the other participants. These calls, in effect, establish a telephone conference, as done in the prior art, with the exception that one channel of an ISDN line is being used, instead of an ordinary telephone line. Then, when all participants are connected in the conference call, the switchover to a video conference is made.

11. During a video conference, three types of information are transferred: audio, video, and pure data. When the audio call is merged into the video call, there is a 4-to-1 compression of the audio data. Video data, because of its varying amount of redundancy, is compressed varying amounts during the conference. (Video data is that captured by one of the video cameras shown in FIG. 1.) Both types of compression (audio and video) are lossy.

In contrast, when pure data is transferred, such as a computer file contained on a disc drive of a conference participant, a non-lossy compression is undertaken.

Numerous substitutions and modifications can be undertaken without departing from the true spirit and scope of the invention. What is desired to be secured by Letters Patent is the invention as defined in the following claims.

We claim:

1. A telecommunications system for enabling multiple computers to share an application program, each of the computers coupled to a display, the system comprising:

a telephone line for linking the computers, the telephone line having first and second channels;

multiple telephones, each of the telephones electronically coupled to the telephone line;

first transmission means for establishing a bidirectional audio connection on the first channel for transferring audio signals between the multiple telephones electronically coupled to the telephone line using the first channel as an audio channel;

conferencing means, performed by one of the computers, comprising:

execution means for executing the application program that is to be shared by each of the computers;

second transmission means for establishing a bidirectional data connection for transmitting image data from the application program to each of the other computers using the second channel as a data channel;

switchover means electronically coupled to one of the telephones, the computer performing the conferencing means, and the telephone line, for incorporating the audio signals from the audio connection into the data connection to generate merged data, for automatically terminating the audio connection on the first channel, and for switching the data connection to use the first channel as a data channel and the second channel as a data channel without substantial interruption of the transfer of the audio signals and image data between the multiple computers; and displaying means, performed by each of the other computers, comprising;

receiving means for receiving the merged data; and restricting means for selectively restricting the display of the received data on the display coupled to the computer.

2. The system of claim 1 wherein the first and second channels each have a data capacity of approximately 64,000 bits per second.

3. The system of claim 1 wherein the audio signals have a bandwidth of approximately 3,000 Hz.

4. The system of claim 1 wherein the data connection is established after the audio connection has been established without substantial interruption of the audio connection.

5. The system of claim 1 wherein the switchover means automatically terminates the audio connection immediately upon establishing the data connection.

6. A method for enabling multiple computers to share an application program, one of the computers being a host computer that is executing the application program to be shared, each of the computers being coupled to a display, a memory, and a telephone line having first and second channels, the method comprising the steps of:

establishing a bidirectional audio connection for transferring audio signals between multiple telephones that are coupled to the telephone line using the first channel as an audio channel;

establishing, in the memory coupled to the host computer, a bidirectional data connection for transferring image data from the application program between the multiple computers using the second channel as a data channel;

incorporating, in the memory coupled to the host computer, the audio signals from the audio connection into the data connection so that the merged data is transferred over the second channel to each of the other computers;

automatically terminating, in the memory coupled to the host computer, the audio connection on the first channel;

switching, in the memory coupled to the host computer, the data connection to use the first channel as a data channel and the second channel as a data channel without substantial interruption of the transfer of the audio signals and image data between the multiple computers;

receiving in the memory coupled to each of the other computers, the merged data from the host computer; and selectively restricting, in the memory coupled to each of the other computers, the display of the received data on the display coupled to each of the computers.

7. The method of claim 6 wherein the first and second channels each have a data capacity of approximately 64,000 bits per second.

8. The method of claim 6 wherein the audio signals have a bandwidth of approximately 3,000 Hz.

9. The method of claim 6 wherein the data connection is established after the audio connection has been established without substantial interruption of the audio connection.

10. The method of claim 6 wherein the step of automatically terminating the audio connection is performed immediately after establishing the data connection.

11. One or more program storage devices readable by a computer having a memory and coupled to a data storage device, each of the program storage devices tangibly embodying one or more programs of instructions executable by a computer to perform method steps for enabling multiple computers to share an application program, one of the computers being a host computer that is executing the application program to be shared, each of the computers being coupled to a display and a telephone line having first and second channels, the method comprising the steps of:

establishing a bidirectional audio connection for transferring audio signals between multiple telephones that are coupled to the telephone line using the first channel as an audio channel;

establishing a bidirectional data connection for transferring image data from the application program between the multiple computers using the second channel as a data channel;

incorporating the audio signals from the audio connection into the data connection so that the merged data is transferred over the second channel to each of the other computers;

automatically terminating the audio connection on the first channel;

switching the data connection to use the first channel as a data channel and the second channel as a data channel without substantial interruption of the transfer of the audio signals and image data between the multiple computers;

receiving in the memory coupled to each of the other computers the merged data from the host computer; and selectively restricting, in the memory coupled to each of the other computers, the display of the received data on the display coupled to each of the computers.

12. The one or more program storage devices of claim 11 wherein the first and second channels each have a data capacity of approximately 64,000 bits per second.

13. The one or more program storage devices of claim 11 wherein the audio signals have a bandwidth of approximately 3,000 Hz.

14. The one or more program storage devices of claim 11 wherein the data connection is established after the audio connection has been established without substantial interruption of the audio connection.

15. The one or more program storage devices of claim 11 wherein the step of automatically terminating the audio connection is performed immediately after establishing the data connection.

* * * * *